(12) United States Patent
Takimoto

(10) Patent No.: US 7,432,918 B2
(45) Date of Patent: Oct. 7, 2008

(54) VIDEO SIGNAL PROCESSING CIRCUIT

(75) Inventor: Takamasa Takimoto, Oizumi-machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 760 days.

(21) Appl. No.: 10/736,776

(22) Filed: Dec. 17, 2003

(65) Prior Publication Data

US 2004/0160434 A1 Aug. 19, 2004

(30) Foreign Application Priority Data

Dec. 17, 2002 (JP) ............................. 2002-365471

(51) Int. Cl.
*G09G 5/00* (2006.01)

(52) U.S. Cl. .................... 345/204; 345/89; 345/213; 348/689; 348/694; 348/697; 358/409; 358/443; 358/445

(58) Field of Classification Search ................. 345/204, 345/213, 87, 89, 690–694
See application file for complete search history.

(56) References Cited

U.S. PATENT DOCUMENTS 4,159,480 A * 6/1979 Tachi .......................... 386/12
4,184,174 A * 1/1980 Aschwanden ................ 348/665
4,398,215 A * 8/1983 Osaka ......................... 380/221
5,461,489 A * 10/1995 Ohara et al. ................ 358/409

FOREIGN PATENT DOCUMENTS

| JP | 03-057967 | * | 3/1991 |
| JP | 11-239281 | * | 8/1999 |

* cited by examiner

*Primary Examiner*—Richard Hjerpe
*Assistant Examiner*—Jennifer T Nguyen
(74) *Attorney, Agent, or Firm*—Morrison & Foerster LLP

(57) ABSTRACT

The video signal processing circuit has a clamp circuit for clamping a composite video signal including a copy guard signal with amplitude of from white to black as well as a pseudo horizontal synchronization signal, a brilliant signal, and a synchronization signal. The circuit also has a synchronization signal separation circuit, which separates the synchronization signal from the composite video signal and a synchronization signal discrimination circuit, which identifies if the synchronization signal coming from the synchronization signal separation circuit has the same cycle as that of a horizontal synchronization signal, and which blocks the signal with the cycle shorter than the cycle of the horizontal synchronization signal, letting only the signal with the cycle of the horizontal synchronization signal pass. The clamping of the composite video signal is performed correctly even during the period when clamp pulse based on the pseudo horizontal synchronization signal with a shorter pulse width in the copy guard signal period is used.

5 Claims, 5 Drawing Sheets

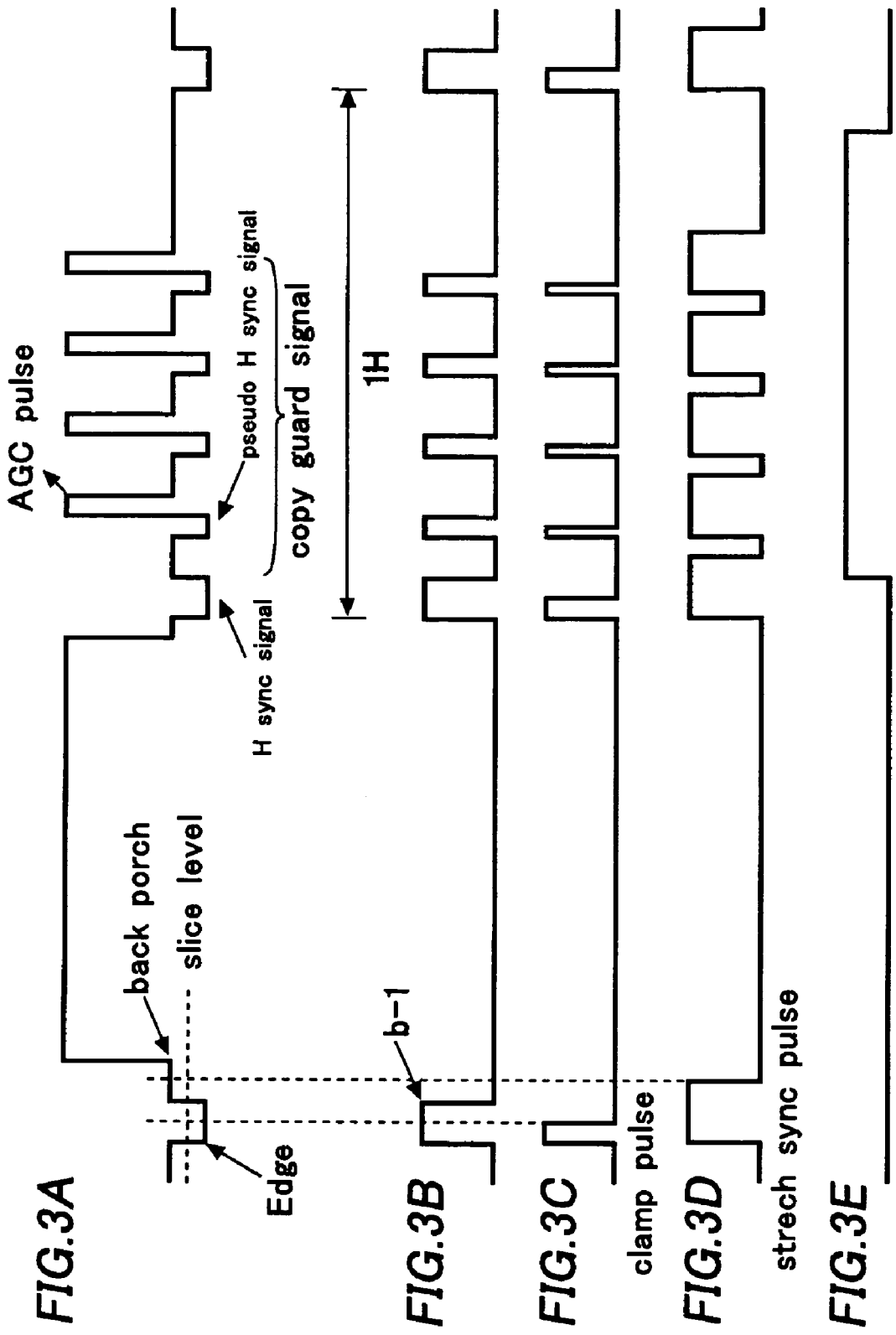

level of a reference voltage source

VIDEO SIGNAL PROCESSING CIRCUIT

BACKGROUND OF THE INVENTION

1. Field of Invention

This invention relates to a video signal processing circuit, which performed clamping and auto gain control (AGC) to a video signal, especially to a video signal processing circuit suitable to process a video signal, which includes a copy guard signal and a pseudo horizontal synchronization signal.

2. Description of Related Art

Home VTR is used to view videotapes, on which video soft is recorded. Some of the videotapes sold in the market have the video signal with a copy guard signal for preventing the duplication of the recorded video soft.

FIG. 2 shows a waveform of the video signal with the copy guard signal. FIG. 2 shows a composite video signal including the copy guard signal with an amplitude to cover from white to black levels and a pseudo horizontal synchronization signal, a vertical synchronization signal, a horizontal synchronization signal, and an equalizing pulse. Various kinds of signal-processing are performed to the video signal reproduced from the videotape.

It is necessary to equalize the edge level of the horizontal synchronization signal by using a clamp circuit and to stabilize the direct current level before performing the signal processing. Also, a AGC circuit equalizes the level of the video signal. The clamp circuit clamps the edge level of the horizontal synchronization signal. This requires a clamp pulse with a pulse width slightly shorter than the pulse width of the horizontal synchronization signal. The AGC circuit also detects the direct current level in a back porch portion of the horizontal synchronization signal. This requires a stretch sync pulse with a pulse width slightly longer than the pulse width of the horizontal synchronization signal.

FIGS. 3A-3E show waveforms of the conventional video signal processing.

FIG. 3A is an enlarged figure showing the waveform of the copy guard signal shown in FIG. 2. FIG. 3A indicates that the copy guard signal is included in the normal horizontal synchronization signal. The cycle of the horizontal synchronization signal is one horizontal period as shown in the figure. The copy guard signal has a pseudo horizontal synchronization signal with the cycle shorter than that of the horizontal synchronization signal and an AGC pulse. Although the number of the cycles varies among the devises, the copy guard signal has, for example, four cycles. The pulse width of the pseudo horizontal synchronization signal is less than a half of the pulse width of the horizontal synchronization signal. The AGC pulse has amplitude of from white to black.

The signal shown in FIG. 3A is sliced at a slicing level shown as the dotted line in FIG. 3A separating the horizontal synchronization signal portion as the pulse signal b-1 shown in FIG. 3B. The clamp pulse is generated as shown in FIG. 3C based on the pulse signal b-1. The edge level of the horizontal synchronization signal shown in FIG. 3A can be detected by using the clamp pulse.

A stretch sync pulse shown in FIG. 3D is also generated based on the pulse signal b-1 in FIG. 3B. The level of the back porch portion shown in FIG. 3A can be detected by using the stretch sync pulse.

Therefore, it is possible to perform clamping as well as AGC to the video signal reproduced from the videotape when a plurality of pulses shown in FIGS. 3A-3E are generated.

However, there are some problems during a copy guard signal period when the clamp pulse shown in FIG. 3C and the stretch sync pulse shown in FIG. 3D are used. The pseudo horizontal synchronization signal with the short pulse width generated during the copy guard signal period is synchronically separated like the normal horizontal synchronization signal is separated. If the clamp pulse based on the pseudo horizontal synchronization signal is used for clamping, the clamp can not be performed properly.

The signal shown in FIG. 3B passes through a low pass filter, LPF, and the phase of the signal will be slightly deviated toward right against the signal shown in FIG. 3A. Therefore, since the AGC pulse comes right after the pseudo horizontal synchronization signal during the copy guard signal period, the edge level (white signal) of the AGC pulse is detected by mistake. A mask pulse shown in FIG. 3E is used in the prior arts in order to block the clamp pulse produced from the copy guard signal.

However, the standard of the copy guard signal is changed often, and the timing of the mask pulse should be changed accordingly. There are also some copy guard signals that do not follow the standardization.

Additionally, if the mask signal is used, the clamping will not be performed even to the normal horizontal synchronization signal during the period when the copy guard signal exists. The change in the direct current level is large during the copy guard signal period because the size of the brilliant signal constantly changes. When this sort of signal goes through a capacitor for stopping a direct current, a phenomenon called a V-sag, where the average direct current level of the video signal changes, will take place. Although a keyed clamp can absorb the V-sag, the V-sag can not be absorbed when the clamp pulse is stopped during the copy guard period.

The AGC suppression of an analog signal takes place in a digital video image device such as DVD recorder when the AGC suppression is not favorable. Therefore, the signal processing circuit that lets the horizontal synchronization signal pass and that blocks the pseudo horizontal synchronization signal during the copy guard signal period is preferable.

SUMMARY OF THE INVENTION

The invention provides a video signal processing circuit that includes a clamp circuit clamping a composite video signal including a copy guard signal having a first synchronization signal, a brilliant signal, and a second synchronization signal, a synchronization signal separation circuit separating the synchronization signals from the composite video signal clamped by the clamp circuit, and a synchronization signal discrimination circuit determining if the synchronization signals supplied by the synchronization signal separation circuit have a same cycle as a horizontal synchronization signal, blocking the synchronization signals when the synchronization signals are determined to have a cycle shorter than the horizontal synchronization signal, and allowing the synchronization signals to pass when the synchronization signals are determined to have the same cycle as the horizontal synchronization signal. The output signal of the synchronization signal discrimination circuit is used as a third synchronization signal synchronically separated.

BRIEF DESCRIPTION OF THE DRAWINGS

FIGS. 3A-3E show waveforms of a conventional video signal processing scheme.

DETAILED DESCRIPTION OF THE INVENTION

Figure 1:
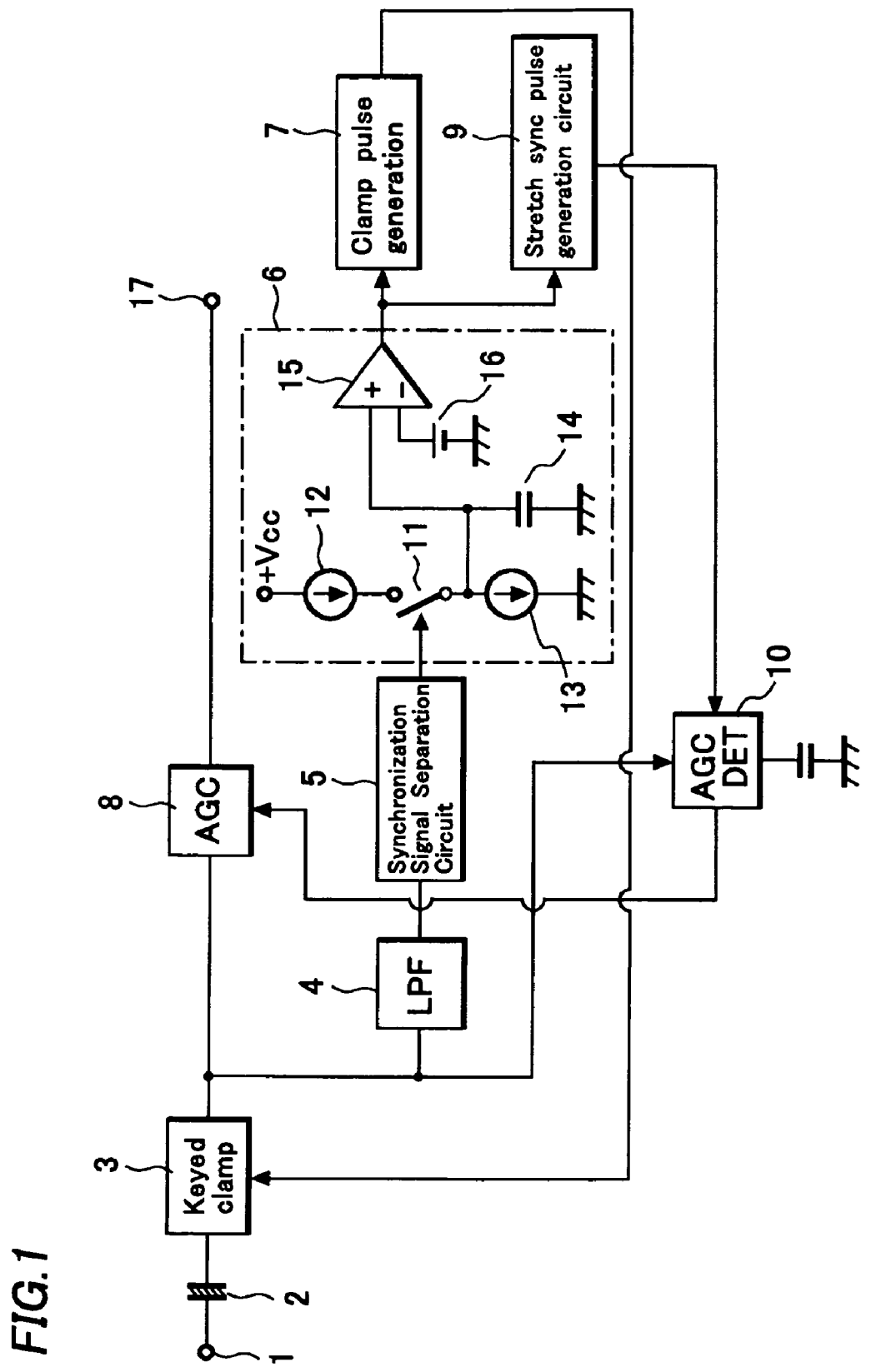
FIG. 1 is a block diagram of the video signal processing circuit of an embodiment of this invention.
Figure 2:
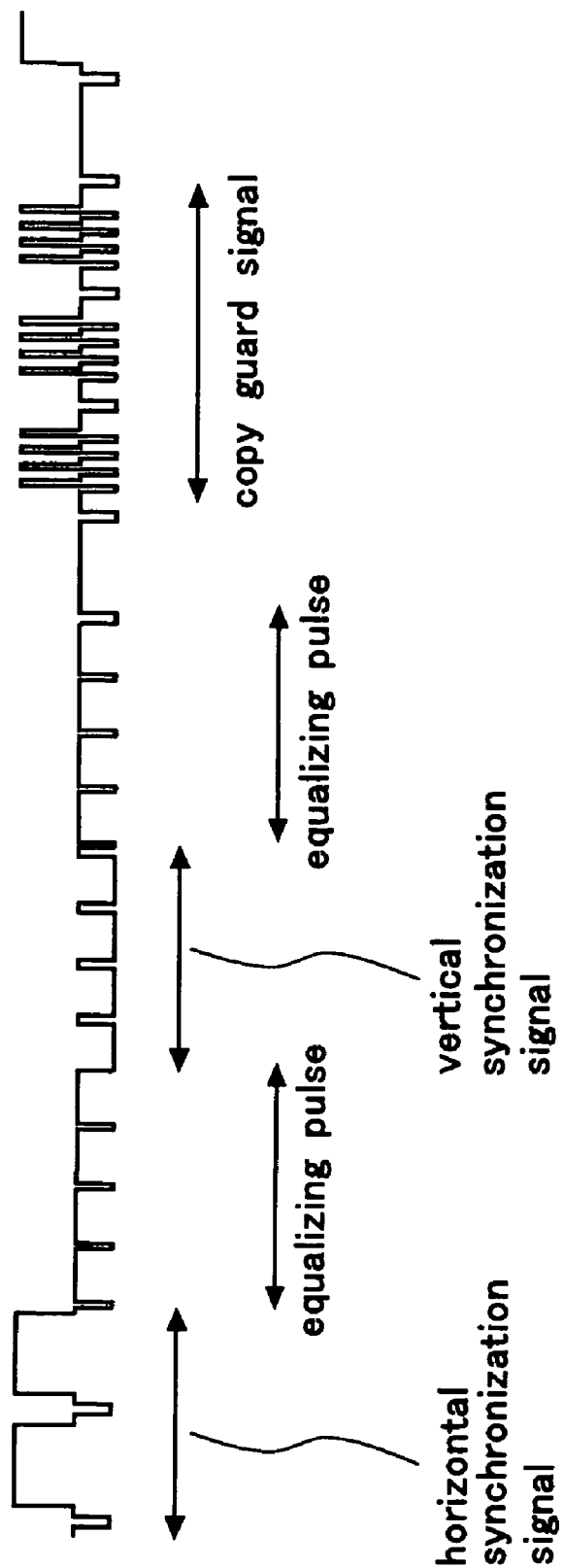
FIG. 2 shows the wave shape of a composite video signal.

The embodiment of this invention will be explained by referring to figures. The reference numeral 1 in FIG. 1 denotes an input terminal, to which a composite video signal including a copy guard signal with an amplitude to cover from white to black levels as well as a pseudo horizontal synchronization signal, a brilliant signal, and a synchronization signal, is applied. The reference numeral 2 indicates a capacitor for clamping, the reference numeral 3 a keyed clamp circuit for keyed-clamping the composite video signal, and the reference numeral 4 an LPF for removing noise from the composite video signal respectively.

The reference numeral 5 denotes a synchronization signal separation circuit, which separates the synchronization signal from the composite video signal. The reference numeral 6 indicates a synchronization signal discrimination circuit, which determines if the synchronization signal coming from the synchronization signal separation circuit 5 has the same cycle as that of a horizontal synchronization signal, and which blocks the signal with the cycle shorter than the cycle of the horizontal synchronization signal, letting only the signal with the cycle of the horizontal synchronization signal pass. The reference numeral 7 denotes a clamp pulse generation circuit, which generates a clamp pulse of the keyed clamp circuit 3 according to the output signal of the synchronization signal discrimination circuit 6. And the reference numeral 8 indicates an AGC circuit, which adjusts the amplitude of the composite video signal clamped by the keyed clamp circuit 3.

The reference numeral 9 denotes a stretch sync pulse generation circuit, which generates a stretch sync pulse for the AGC circuit 8 according to the output signal of the synchronization signal discrimination circuit 6, and the reference numeral 10 denotes an AGC detection circuit, which performs the AGC detection according to the composite video signal and the stretch sync pulse, and which adjusts a gain of the AGC circuit 8.

The operation of the circuits shown in FIG. 1 will be explained by referring to FIG. 4. The composite video signal from the input terminal 1 is clamped by the capacitor 2 for clamping and the keyed clamp circuit 3. The composite video signal, whose synchronization signal has been equalized at the edge level by clamping, is applied to the LPF 4, the AGC circuit 8, and the AGC detection circuit 10.

Figure 4A:
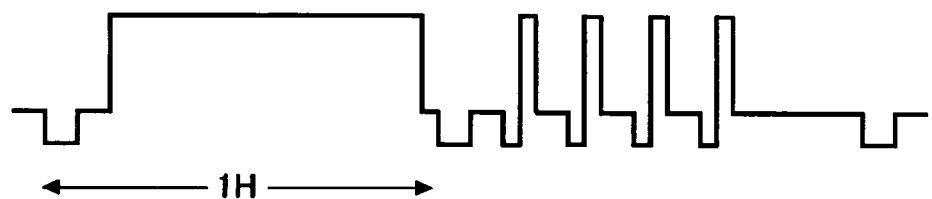
FIGS. 4A-4F show waveforms of the video signal processing of the embodiment.
Figure 4B:
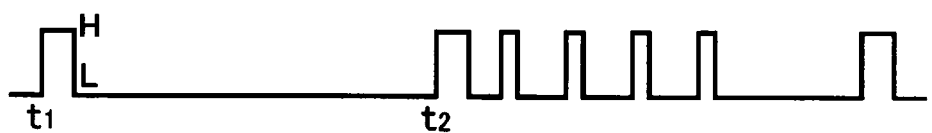

FIG. 4A shows the composite video signal that has passed through the LPF 4. The composite video signal in FIG. 4A becomes a pulse signal shown in FIG. 4B after the synchronization signal separation circuit 5 separates the synchronization signal from the composite video signal. The pulse signal closes a switch 11 in the synchronization signal discrimination circuit 6 at high level and opens the switch 11 at low level. The current value of a constant current source 12 in the synchronization signal discrimination circuit 6 is set large. The current value of a constant current source 13 in the synchronization signal discrimination circuit 6 is set small.

Suppose it is time t1 in FIG. 4. When the switch 11 is closed, a capacitor 14 is rapidly charged by the current of the constant current source 12, as seen from FIG. 4C. This operation is the same operation as that of wave peak detection. While the pulse signal in FIG. 4B is at high level, the output voltage of the capacitor 14 is high. When the pulse signal becomes low level, the switch 11 opens and a capacitor 14 is gradually discharged by the current value of the constant current source 13.

Figure 4C:

Therefore, as shown in FIG. 4C, the level of the wave becomes gradually lower. The level of a reference voltage source 16 of a comparator 15 in the synchronization signal discrimination circuit 6 is set at the level shown as a dotted line in FIG. 4C. Thus, the pulse signal d-1 shown in FIG. 4D can be obtained at the output edge of the comparator 15.

Suppose it is time t2 in FIG. 4. The synchronization signal discrimination circuit 6 operates in the same way as that of time t1 and the pulse signal d-2 in FIG. 4D becomes high. However, the pulse signal coming right after the horizontal synchronization signal at time t2 is the pseudo horizontal synchronization signal. The pseudo horizontal synchronization signal is generated right after the horizontal synchronization signal is completed, immediately closing the switch 11. When the switch 11 is closed, the capacitor 14 is rapidly charged as seen from FIG. 4C. The discharge from the capacitor 14 takes place when the pseudo horizontal synchronization signal finishes, but the next pseudo horizontal synchronization signal comes immediately after that. The synchronization signal discrimination circuit 6 repeats this operation as the same number of times as that of the pseudo horizontal synchronization signals. Therefore, the voltage of the capacitor 14 will not go down, keeping the value higher than the level of a reference voltage source 16 of the comparator 15.

Figure 4D:
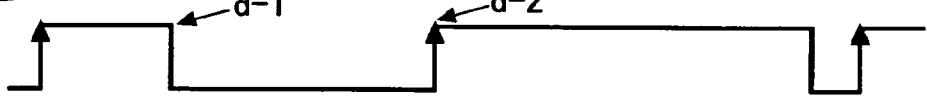

Therefore, the output signal of the synchronization signal discrimination circuit 6 shown in FIG. 4D is obtained. The timing when the pulse signal in FIG. 4D becomes active is the timing of the horizontal synchronization signal. Therefore, the synchronization signal discrimination circuit 6 detects if the synchronization signal from the synchronization signal separation circuit 5 comes as the same cycle as that of the horizontal synchronization signal, and blocks the signal with the cycle shorter than that of the horizontal synchronization signal, letting only the signal with the cycle of the horizontal synchronization signal pass. Therefore, the synchronization signal discrimination signal 6 can separate the synchronization signal suitable for producing the clamp pulse.

Figure 4E:

The clamp pulse generation circuit 7 and the stretch sync generation circuit 9 respectively generate the pulse with a certain pulse width according to the activation of the pulse shown in FIG. 4D. The clamp pulse generation circuit 7 and the stretch sync generation circuit 9 can be configured, for example, from a single stable multi-vibrator. The clamp pulse generation circuit 7 generates the clamp pulse shown in FIG. 4E, and the stretch sync generation circuit 9 generates the stretch sync pulse shown in FIG. 4F. The clamp pulse in FIG. 4E is applied to the keyed clamp circuit 3.

Figure 4F:

The stretch sync pulse shown in FIG. 4F is applied to the AGC detection circuit 10. In the clamp pulse shown in FIG. 4E, as it is clear from the comparison with FIG. 4B, only the pulse signal of the horizontal synchronization signal is extracted. The same thing can be said as to the stretch sync pulse. Therefore, the clamp circuit will not perform a wrong operation or the AGC suppression will not take place due to the pseudo horizontal synchronization signal. Also, unlike the prior arts, the mask pulse is not needed. Therefore, the change in the copy guard signal will not cause any problem.

The AGC detection circuit 10 detects the level of the wave at the back porch portion of the horizontal synchronization signal based on the stretch sync pulse shown in FIG. 4F. The video signal with certain amplitude can be obtained at a terminal 17 by adjusting the gain of the AGC circuit 8 using the detected output.

Figure 5:
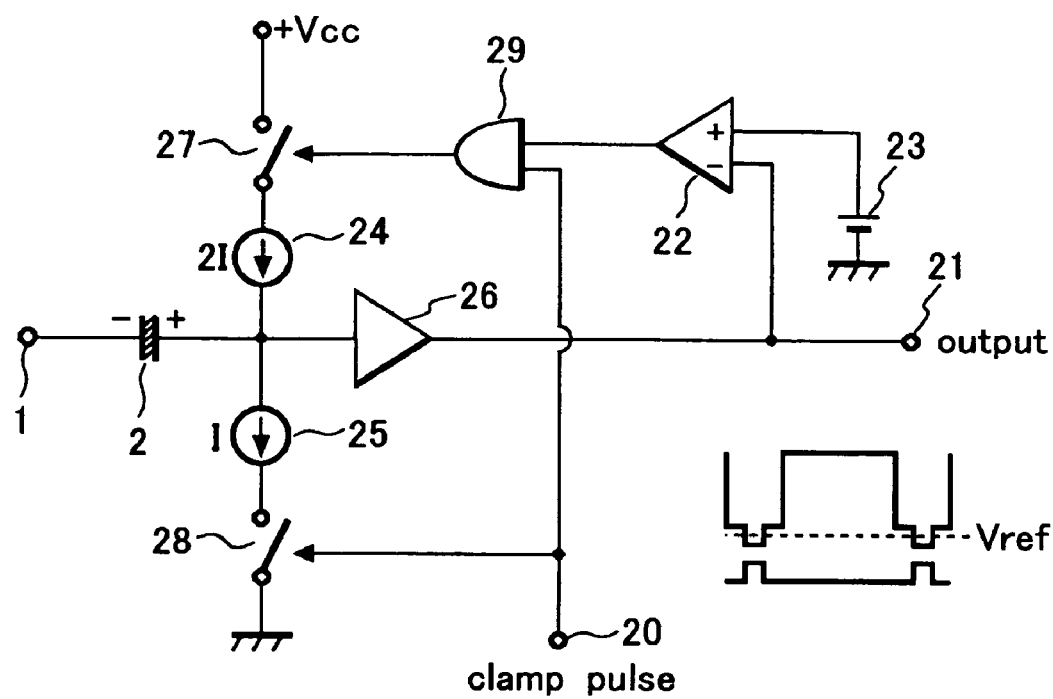
FIG. 5 is a circuit diagram of the keyed clamp circuit of the embodiment.

FIG. 5 shows an example of the keyed clamp circuit 3. The operation of the keyed clamp circuit 3 will be briefly explained. The same reference numerals will be given to the same components in FIG. 5 as in FIG. 1. The keyed clamp circuit 3 equalizes the edge levels of the horizontal synchronization signal with the reference level while the clamp pulses are coming, equalizing the direct current level at the edge of the horizontal synchronization signal.

The composite video signal is obtained at the input terminal 1, the clamp pulse at a terminal 20, and the clamped composite video signal at an output terminal 21 respectively. In the circuit shown in FIG. 5, the reference value Vref of the reference voltage source 23 connected to a comparator 22 and the direct current level at the edge of the horizontal synchronization signal are equalized. The current value of a constant current source 24 is set at 2I, and the current value of a constant current source 25 at I respectively.

The composite video signal coming from the input terminal 1 is reproduced as a direct current potential by the capacitor 2 for clamping, and then supplied to the output terminal 21 through a buffer 26. The composite video signal at the output terminal 21 is compared to the reference value Vref of the reference voltage source 23 of the comparator 22.

The output signal from the comparator 22 becomes high level when the direct current level at the edge of the horizontal synchronization signal is smaller than the Vref. The clamp pulse, which becomes high level during the clamp period, comes from the terminal 20. Switches 27, 28 close at high level. Since the output of an and-gate 29 becomes high level, the both switches 27, 28 close.

The current I goes from the constant current source 24 to the input terminal 1, charging the capacitor 2. The output direct current level of the buffer 26 goes up when the capacitor 2 is charged with the polarity shown in the figure. When the current level continues increasing and the output direct current level of the buffer 26 exceeds the Vref, the output level of the comparator 22 becomes low level. Then, the output of the and-gate 29 becomes low level at the next clamp pulse, opening the switch 27 and closing the switch 28.

Then, the current I goes from the capacitor 2 to the ground, discharging the capacitor 2. This time, the output direct current level of the buffer 26 goes down. These operations are repeated, setting the direct current level at the edge of the horizontal synchronization signal of the output terminal 21 at the Vref during the clamp pulse period. As a result, the video signal during the period other than the horizontal synchronization signal period is also generated at the output terminal 21 along with the corrected direct current. Therefore, keyed clamp is performed by the circuit shown in FIG. 5

What is claimed is:

1. A video signal processing circuit comprising:
    a clamp circuit clamping a composite video signal including a copy guard signal which comprises a first predetermined synchronization signal, a brilliant signal and a second predetermined synchronization signal, the first predetermined synchronization signal having the same frequency as a horizontal synchronization signal and the second predetermined synchronization signal having a frequency shorter than the same frequency;
    a synchronization signal separation circuit separating the first and second predetermined synchronization signals from the composite video signal clamped by the clamp circuit; and
    a synchronization signal discrimination circuit blocking the second predetermined synchronization signal and allowing the first predetermined synchronization signal to pass, an output signal of the synchronization signal discrimination circuit being used as a third predetermined synchronization signal synchronically separated,
    wherein the synchronization signal discrimination circuit comprises a charging circuit charging a capacitor based on the first and second predetermined synchronization signals from the synchronization signal separation circuit, a discharging circuit discharging the capacitor and a comparator comparing a level of a charging voltage of the capacitor with a reference voltage.

2. The video signal processing circuit of claim 1, wherein the clamp circuit is a keyed clamp circuit equalizing a direct current level of the composite video signal with a reference level based on a clamp pulse of a video signal.

3. The video signal processing circuit of claim 2, further comprising a clamp pulse generation circuit generating a clamp pulse of the clamp circuit based on the third predetermined synchronization signal.

4. The video signal processing circuit of claim 2, further comprising a low pass filter receiving an output signal of the clamp circuit and applying an output signal of the low pass filter to the synchronization signal separation circuit.

5. A video signal processing circuit of comprising:
    a clamp circuit clamping a composite video signal including a copy auard signal which comprises a first predetermined synchronization signal, a brilliant signal and a second predetermined synchronization signal, the first predetermined synchronization signal having the same frequency as a horizontal synchronization signal and the second predetermined synchronization signal having a frequency shorter than the same frequency;
    a synchronization signal separation circuit separating the first and second predetermined synchronization signals from the composite video signal clamped by the clamp circuit;
    a synchronization signal discrimination circuit blocking the second predetermined synchronization signal and allowing the first predetermined synchronization signal to pass, an output signal of the synchronization signal discrimination circuit being used as a third predetermined synchronization signal synchronically separated;
    an AGC circuit adjusting an amplitude of the composite video signal clamped by the clamp circuit;
    a stretch sync pulse generation circuit generating a stretch sync pulse for the AGC circuit according to the third predetermined synchronization signal; and
    an AGC detection circuit performing an AGC detection according to the composite video signal and the stretch sync pulse and adjusting a gain of the AGC circuit.

* * * * *